United States Patent
Richard et al.

(10) Patent No.: US 10,300,448 B2
(45) Date of Patent: May 28, 2019

(54) DEVICE ALLOWING THE TEMPORARY STORAGE AND PUTTING BACK INTO CIRCULATION OF A CERTAIN QUANTITY OF CATALYST IN CATALYTIC REFORMING INSTALLATIONS

(71) Applicant: IFP Energies Nouvelles, Rueil-Malmaison (FR)

(72) Inventors: Florence Richard, Garches (FR); Fabian Lambert, Chatou (FR); Thierry Bancel, Pont Salomon (FR); Cecile Floer, Rueil Malmaison (FR); Guillaume Vinay, Rueil Malmaison (FR)

(73) Assignee: IFP Energies Nouvelles, Rueil-Malmaison (FR)

( * ) Notice: Subject to any disclaimer, the term of this patent is extended or adjusted under 35 U.S.C. 154(b) by 0 days.

(21) Appl. No.: 15/843,000

(22) Filed: Dec. 15, 2017

(65) Prior Publication Data
US 2018/0169601 A1   Jun. 21, 2018

(30) Foreign Application Priority Data

Dec. 16, 2016 (FR) .................................... 16 62637

(51) Int. Cl.
*B01J 8/12* (2006.01)
*B01J 8/22* (2006.01)
*C10G 35/12* (2006.01)
*C10G 47/28* (2006.01)

(52) U.S. Cl.
CPC ............... *B01J 8/12* (2013.01); *B01J 8/222* (2013.01); *C10G 35/12* (2013.01); *C10G 47/28* (2013.01); *B01J 2208/00761* (2013.01); *B01J 2208/00769* (2013.01); *B01J 2208/00814* (2013.01); *B01J 2208/00884* (2013.01); *B01J 2219/00036* (2013.01)

(58) Field of Classification Search
CPC ... B01J 8/12; B01J 8/003; B01J 8/0035; B01J 2208/00752; B01J 2208/00769; B01J 2208/00884
See application file for complete search history.

(56) References Cited

U.S. PATENT DOCUMENTS

2017/0014791 A1   1/2017 Lambert

FOREIGN PATENT DOCUMENTS

| EP | 0577118 A1 | 1/1994 |
| FR | 2966751 B1 | 11/2013 |
| FR | 3017806 A1 | 2/2016 |

OTHER PUBLICATIONS

French n° 1662637 Search Report dated Jul. 17, 2017.

*Primary Examiner* — Lessanework Seifu
(74) *Attorney, Agent, or Firm* — Millen, White, Zelano and Branigan, P.C.

(57) ABSTRACT

A device that firstly allows temporary storage of a certain quantity of catalyst and, secondly, allows putting back into circulation of this quantity of catalyst in regenerative reforming installations following an interruption in the circulation of the catalyst.

12 Claims, 3 Drawing Sheets

DEVICE ALLOWING THE TEMPORARY STORAGE AND PUTTING BACK INTO CIRCULATION OF A CERTAIN QUANTITY OF CATALYST IN CATALYTIC REFORMING INSTALLATIONS

The present invention relates to catalytic reforming, and more particularly to moving bed reactors allowing implementation of said process.

Moving bed catalytic reactors, i.e. with a slow gravitational flow and traversed by the feed, are well known to the person skilled in the art. Nevertheless, industrial-scale catalytic reforming installations that use a number of reactors of this type arranged in series, with intermediate reheating of the feed at the inlet to each reactor in the series, still leave something to be desired, particularly in relation to the consequences of thermal expansion phenomena within a reactor.

In fact, the process of catalytic reforming calls for operating temperatures of around 500° C. Such high temperatures cause expansion of the steel walls of the reactor, such that the amounts of catalytic beads introduced may vary.

The special feature of regenerative reactors is precisely that the catalytic bed, made up of small beads of porous aluminium, circulates continuously through the reactors in the moving bed state using slow gravitational flow.

A sudden stoppage of the installation halts circulation of the catalyst and the internal build-up of this tends to place high stresses on the walls of the reactor as they cool. The catalyst can cause damage to the reactor and thus not inconsiderable financial costs.

The closest prior art represented by document FR 3 017 806 describes a temporary storage area for the catalyst able to recover a certain amount of catalyst when circulation comes to a halt, controlled or not. For this temporary storage area to function correctly, it is necessary that when the reactor restarts it is able to empty into the bed that has been put back into circulation. The object of the present invention is to describe a technological solution for the reinsertion of the beads in the catalytic bed following a halt of any length in the circulation of catalyst, whether or not such stoppage is controlled.

EXAMINATION OF THE PRIOR ART

The prior art in the field of moving bed type flow reactors, in particular catalytic reforming of petrol, is very broad.

Only the documents that describe typical configurations of moving bed reactors are considered here. Patents U.S. Pat. Nos. 3,864,240, 4,040,794, FR 2 160 269 and FR 2 946 660 describe different types of moving bed reactors that can in particular be used in a process of catalytic reforming of petrol. In this type of process, the catalyst circulates between the different reactors of the reaction section, most often 4 reactors, then towards the regenerator. The regenerated catalyst is then sent back to the reaction section.

According to other variants as described in document U.S. Pat. No. 3,706,536, the various catalytic zones are stacked to form a single reactor (referred to as a "stacked reactor") comprising the various reaction sections between which the catalyst circulates through force of gravity.

Document FR 3 017 806 describes a device allowing interruptions in the circulation of the catalyst in a moving bed type reactor with cross-flow of the feed in relation to the catalyst.

The device described in the cited document consists of flaps located in the lower part of baskets enclosing the quantity of catalyst, with these flaps able to move along a vertical axis to release a storage space following an interruption in the circulation of the catalyst, and then allow the catalyst stored to be put back into circulation.

The present invention can be considered as an improvement to the device described in the cited document. To facilitate emptying of the temporary storage area (11), the two systems described in document FR 3 017 806 have been modified by the introduction of a deflector which improves the emptying of the storage area.

Windows (14), of generally rectangular shape, are provided along the circumference on the flap (7) to allow filling of the area (11).

These windows (14) can preferably be rectangular in shape and are provided in the bottom of the flap (7).

Figure 1A:
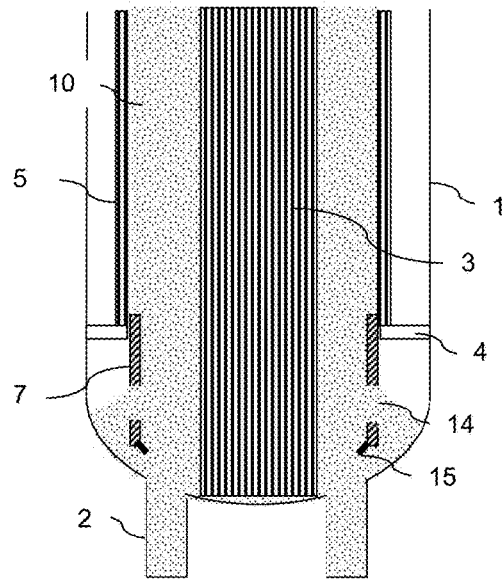
FIGS. 1a, 1b and 1c describe the device of the invention in its basic version.

FIG. 1a corresponds to normal operation. A certain quantity of catalyst spreads beyond the vertical plane defined by the baskets (5).

Figure 1B:
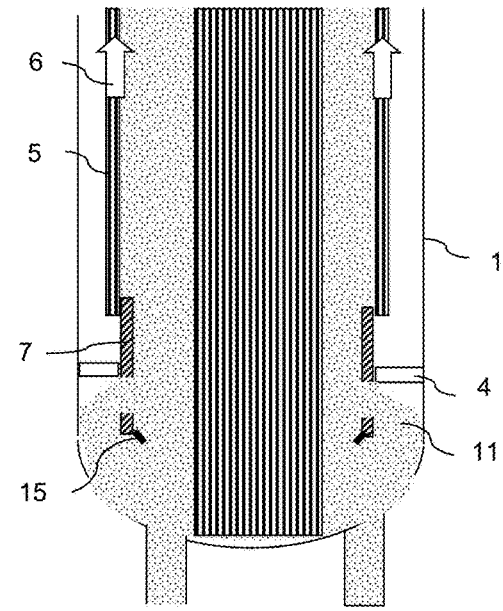

FIG. 1b corresponds to the situation of a stoppage in the circulation of the catalyst. When there is a stoppage, the reactor cools and circulation of the catalyst is interrupted. Cooling of the reactor then causes the basket (5) and thus the windows (14) of the flap (7) to rise up. This allows the catalyst to fill a larger space in the storage area (11).

Figure 1C:
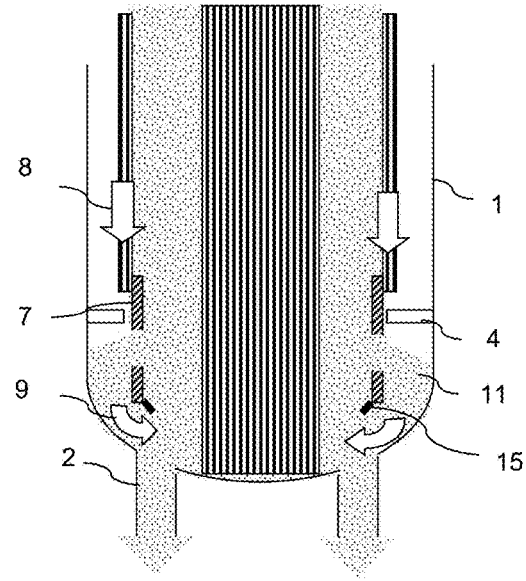

FIG. 1c corresponds to the return to normal operation, i.e. with circulation of the catalyst in the dip legs (2), the reactor reheating and the catalyst circulating again. The storage area (11) empties, reverting to its initial state thanks to the presence of the deflector (15) at the bottom of the flap (7). The deflector (15) is a plane or a curved wall, inclined, welded or attached in any manner known to the person skilled in the art to the flap (7), around the full circumference or part of this. It may also be movable about the axis to which it is attached.

A simplified version of this system may be a flap (7) without a window where the catalyst can fill a greater part of the storage area (11) during cooling through the perforated part below the deflector.

Figure 2A:
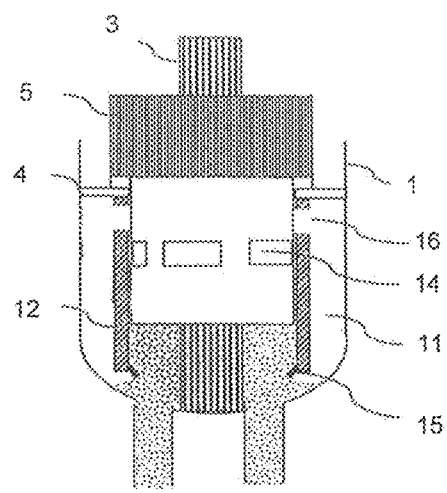
FIGS. 2a, 2b and 2c describe the device according to the invention in its variant in which the flaps (7) move in fixed sleeves (12).
Figure 2B:
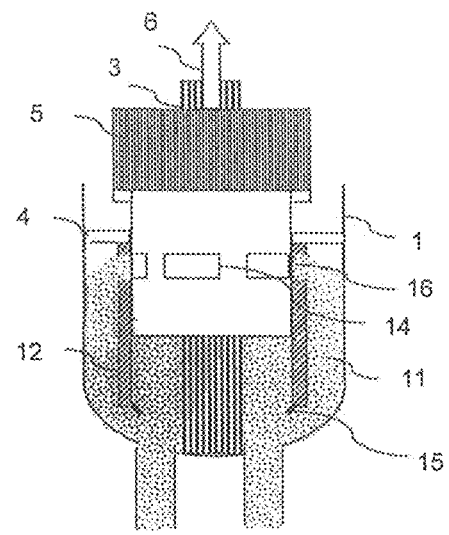
Figure 2C:
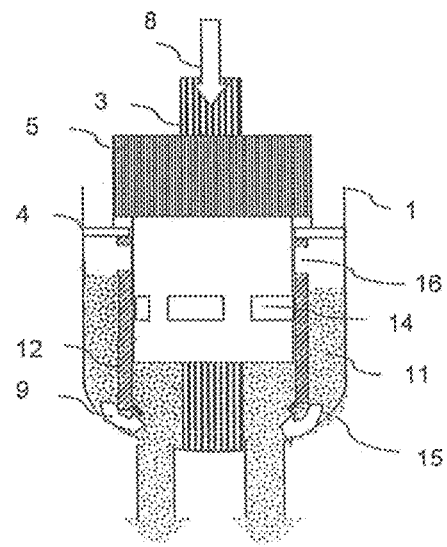

FIGS. 2a, 2b and 2c describe the device according to the invention in its variant in which the flaps (7) move in fixed sleeves (12).

In these figures, the substantially vertical sleeve (12) is maintained either by attachment means (welding, bolts or other) on the supports (4), or simply by resting on the floor of the reactor (1).

Openings (16) are made at a level between the lower extremity of the baskets (5) and the upper part of the sleeve (12).

Windows (16), for example with a rectangular shape, are furthermore provided in the top part of the sleeve (12) on part or all of the circumference.

A deflector (15) is welded, or attached in any manner known to the person skilled in the art, to the lower part of the sleeve (12). It may have the form of an inclined plane or a curved wall, over the full circumference of the sleeve (12) or just part of this.

During the stoppage of the circulation represented in FIG. 2b, the sleeves (12) rise up and the windows (14) coincide with the windows (16) thereby allowing the passage of a certain quantity of catalyst into the storage area (11).

FIG. 2c corresponds to the resumption of circulation and emptying of the storage area (11).

The deflector (15) allows the catalyst to flow outside of the storage area (11) when the reactor is restarted. During this restart, the reactor reverts to its operating temperature, and the catalyst again circulates. The basket (5) progressively drops down, closing the access to the windows (16), and little by little the storage area (11) empties completely, an operation facilitated by the presence of the deflector (15).

Figure 3:
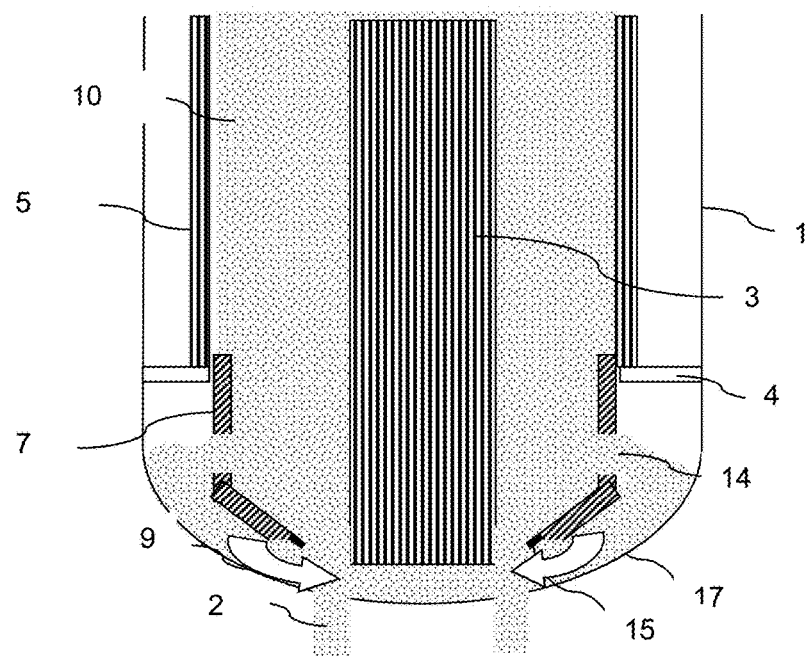
FIG. 3 is a representation of the device according to the invention in which a flap (7) is shown, the end portion of which is inclined in relation to the vertical, with this flap terminating by the deflector (15) with an inclination that is substantially the same as that of the end portion of the flap (7).

FIG. 3 is a representation of the device according to the invention in which a flap (7) is shown, the end portion of which is inclined in relation to the vertical, with this flap terminating by the deflector (15) with an inclination that is substantially the same as that of the end portion of the flap (7).

SUMMARY DESCRIPTION OF THE INVENTION

The invention essentially consists of modifying the lower part of moving bed reactors by adding to the moving basket (5) containing the catalyst a vertically mobile flap device, located in the extension of the vertical walls of the basket (5) and equipped in its lower part with a deflector (15) forming a certain angle with the vertical so as to:

1) transfer a certain quantity of catalyst to a temporary storage area (11), located on the periphery of the reactor in the lower area adjoining the walls, 2) reinjecting in the bed, that part of the catalyst transferred to said storage area when the basket (5) is raised.

This temporary storage area (11) must be positioned in such a way that the resumption of circulation of the catalyst takes place close to the circulation legs (2) of the reactor.

More specifically, the present invention can be described as a catalytic reactor implementing a ring-shaped moving bed catalyst, limited at its outer periphery by vertical walls forming a cylindrical basket (5), and at its internal periphery by a central collector (3), also vertical, with the catalyst flowing slowly by force of gravity into the space between the basket (5) and the central collector (3), and circulating downwards through the circulation legs (2) positioned on the substantially hemispherical base of said reactor.

The basket (5) moves along a substantially vertical axis over a distance of from a few centimeters to 10 cm, this basket (5) being equipped with flaps (7) that are themselves substantially vertical, positioned on the lower part of the basket (5), in the extension of the vertical wall of said basket (5).

During operation of the reactor, this may experience an interruption in the circulation of the catalyst, resulting in a fall in temperature of the reaction space and compression of the catalyst subjecting the walls and the various internal parts to mechanical stresses that can be very high.

The present invention consists of equipping the reactor with means allowing a certain quantity of catalyst to move to a temporary storage area (11) to cause a lowering in the level of mechanical stresses and then subsequently emptying of the storage area to place the temporarily stored catalyst back in circulation.

The present invention can thus be defined as a catalytic reactor implementing a ring-shaped moving bed catalyst, limited at its outer periphery by walls forming a cylindrical basket (5), and at its internal periphery by a central collector (3), with the catalyst flowing slowly by force of gravity into the space between the basket (5) and the central collector (3), and circulating downwards through the circulation legs (2) positioned on the substantially hemispherical base of said reactor, said baskets being movable along a substantially vertical axis over a distance of from a few centimeters to 10 cm, this basket (5) being equipped with flaps (7) themselves substantially vertical, positioned on the lower part of the basket (5), in the extension of the wall of said basket (5).

The reactor according to the present invention can have phases of stoppage of circulation of the catalyst, intentional or not.

When there is an interruption in the circulation of the catalyst, a catalyst storage space or area (11) situated in the lower part of the reactor adjoining the wall, and close to the dip legs (2), is released by moving the basket (5) and attached flaps (7) assembly upwards.

The storage area (11) of the catalyst is located in the lower part of the reactor adjoining the wall, and close to the dip legs (2). This storage area is released when the basket (5) and attached flaps (7) assembly is moved upwards, the flap (7) itself being equipped with a deflector (15) rigidly or freely attached, and which forms an angle alpha with the vertical of between 30 and 60°, preferably of between 45 and 55°.

Mobility along the axis of attachment can also be envisaged allowing an angle of between 0° and 60° with the vertical.

In a preferred variant of the invention, the deflector (15) is rigidly connected to the flap (7) and the flap (7) has an end portion, itself inclined with respect to the vertical. Preferably, the angle of inclination of the end portion of the flap (7) and of the deflector (15) attached to it are the same. This variant is represented in FIG. 3.

Next, the catalyst is put back into circulation by gravity as soon as circulation has been re-established, with the storage area (11) progressively emptying itself of the catalyst by means of the deflector (15).

In the usual technology of moving bed catalytic reactors according to the invention, the catalyst is enclosed in ring-shaped baskets (5), the walls of which are comprised screens that allow the feed to pass from the outside to the inside of the basket (5), and then the reaction effluents from the inside of the basket (5) to the central collector (3). The feed therefore circulates in cross-flow to the catalyst flowing slowly by force of gravity, at around a few meters per hour.

In a variant of the present invention, the flaps (7) slide in fixed vertical sleeves (12) that are located in the extension to the vertical walls of the basket (5) and are equipped with windows (14) obstructed by the sleeves (12) during normal circulation, said windows (14) being released when the basket (5) is raised following an interruption in the circulation of the catalyst.

A certain quantity of catalyst that can be assessed as a percentage of the stock at between 0.2 and 5% passes through said windows (14) to the storage area situated in the lower part of the reactor between the sleeve (12) and the wall of the hemispherical base of the reactor, and at a distance of more than 30 cm from said wall. In the event of the height between the base of the reactor (1) and the supports (4) being insufficient, this part of the reactor may be modified to extend it by a height of up to 1 meter.

Generally, the windows (14) have a rectangular shape allowing steady entry of the catalyst into the storage area (11). They may also have a triangular shape, with the tip of the triangle pointing upwards, to allow progressive entry of the catalyst into the storage area (11). The invention is not connected to the shape of the windows (14) the shape of which may be adjusted by the person skilled in the art as a function of the particular features of the reactor concerned.

The invention also relates to any refining or petrochemical process using the reactor according to any one of the above characteristics. In particular, the reactor according to the invention can be used in a process of catalytic reforming of petrol or also in a process of hydrotreatment of residues.

DETAILED DESCRIPTION OF THE INVENTION

This paragraph goes into greater detail on the situation of a stoppage in circulation of the catalyst, transfer of a certain quantity of this catalyst to the temporary storage area, and the putting back into circulation of this quantity of catalyst.

In normal operation, that is to say at around 500° C. and at low pressure, the steel walls of a regenerating reforming reactor expand. Together with the continuous circulation of the catalyst, this expansion brings about the introduction of a larger quantity of the catalyst into the reactor than that known as the at rest quantity. In the event of a stoppage in the circulation of the catalyst, with the reactor stopped, the walls cool and contract resulting in the exertion of strong compressive forces by the stopped catalyst against the walls of the reactor.

The forces generated at the level of the walls of the reactor are such that the upper part of the reactor lifts, which can cause the destruction of certain internal parts, deformations in the Johnson screen and the mounting bolts, and also the rupture of particles of catalyst resulting in the creation of fine particles causing further losses of feed.

The present invention describes a moving bed catalytic reactor that firstly allows storage of part of the catalyst in a temporary storage area, and then secondly the putting back into circulation of the stored catalyst.

The invention is based on the existence of a moving basket (5) which is able to rise upwards over a distance of from a few cm to 10 cm, when there is a stoppage in the circulation of the catalyst, and on the existence of a deflector (15) attached to the walls (12) and forming a certain angle with the vertical to facilitate emptying of the storage area once circulation of the catalyst resumes.

To facilitate said resumption in circulation of the catalyst, the deflector (15) is positioned at the lower extremity of the sleeve (12) or of the flap (7), and close to the circulation legs (2) of the reactor. "Close to" means a position with an offset towards the vertical walls of the reactor (1) with respect to the vertical axis of the dip legs (2) of less than 10 cm and a distance "d" between said deflector and the closest point of the wall of the reactor that is greater than or equal to 10 cm, to avoid any sticking of the catalyst during emptying.

The length of the deflector (15) must be sufficient to divert the descending catalyst into the basket (5), without being so long that it obstructs the window.

By way of example, a length of between 10 particle diameters and the half-opening may suffice so as not to considerably reduce the emptying window. The angle of the deflector must be large enough to divert the catalyst, without being so big that it stops it.

An angle of between 30 and 60° with the vertical must allow emptying of the storage area. The deflector (15) can be positioned in the continuation of the wall of the sleeve (12) or of the flap (7), or offset to one or other side of the wall to facilitate its securing.

The thickness of the deflector must be sufficient to withstand the weight of the catalyst that it is supporting and to not deform when there are changes in temperature. A thickness equivalent to or greater than that of the wall of the basket is sufficient but without exceeding twice the thickness of the wall of the basket (5).

Finally, the deflector that is positioned on the upper boundary of the emptying window must be close to the vertical of a circulation leg (2) of the reactor.

Where the outer basket (5) is positioned far away from the circulation leg (2), the latter being close to the central collector (3), it is preferable to modify the shape of the storage area (11) so that the outlet window is properly positioned. To do this, the shape of the lower part of the flap (7) or sleeve (12) can be modified in order to prolong the flap (7) (or the sleeve (12) in solution 2) according to the shape of the bottom of the reactor (1). This part (17) can either be fixed to the flap (7) and move with it, or mobile in relation to the vertical part of the flap (7) or the sleeve (12). In this case, the lower part (17) must be fixed to the base of the reactor. An example of such an extension is given in FIG. 3 for solution 1.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding application No. FR 1662637, filed Dec. 16, 2016 are incorporated by reference herein.

EXAMPLE ACCORDING TO THE INVENTION

The following example gives the dimensions of the storage area and of the deflector in the case of an industrial reforming reactor that is 14 m tall with an external diameter of 2.7 meters. The circulation legs (2) have a diameter of 7 cm and the central collector a diameter of 1.2 m.

Following an interruption in circulation bringing about a sudden cooling of the catalyst, the quantity of catalyst to be evacuated to the temporary storage area is assessed at 600 kg, or approximately 2% of the stock. An experimental test was performed on a section of a PMMA (polymethylmethacrylate) reactor to find a real dimension for the reactor.

The experimental study was performed on a section of the PMMA reactor with a thickness corresponding to the real reactor dimension supplemented by a DEM (Discrete Element Method) simulation using the GRAINS software developed by the applicant.

These tests resulted in a deflector (15) length of 7 cm with a window (14) height of 200 mm.

The tilt angle of the deflector (15) with respect to the vertical is 53°.

The deflector dimensioned in this way allows:

1) introduction into the temporary storage area of a certain quantity of catalyst;

2) emptying of the catalyst from the storage area for a speed of circulation of the catalyst in the basket (5) equivalent to that found during industrial operation, 0.1 mm/s;

3) flowing of the catalyst contained in the storage area (11) according to the arrow (9) at a speed of the same order of magnitude as the catalyst flowing in the ring between the central collector (3) and the basket (5), allowing reinsertion in the catalytic bed in a regular manner. The emptying time thus depends on the height of the filling zone (11); it generally remains less than an hour.

The preceding example can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A catalytic reactor having a ring-shaped moving bed catalyst, limited at its outer periphery by walls forming a cylindrical basket (5), and at its internal periphery by a central collector (3), with the catalyst flowing slowly by force of gravity into the space between the basket (5) and the central collector (3), and circulating downwards through circulation legs (2) positioned on the substantially hemispherical base of said reactor, said basket (5) being movable along a substantially vertical axis over a distance of from a few centimeters to 10 cm, this basket (5) being equipped with flaps (7) themselves substantially vertical, positioned on the lower part of the basket (5), in the extension of a wall having flaps (7), in which reactor, when there is an interruption in the circulation of the catalyst, a catalyst storage space (11) situated in the lower part of the reactor adjoining the wall, and close to dip legs (2), is released by moving the basket (5) and attached flaps (7) assembly upwards, flaps (7) being equipped with a deflector (15) rigidly or freely attached, and which forms an angle alpha with the vertical of between 30 and 60°.

2. The catalytic reactor according to claim 1, wherein the deflector (15) is rigidly connected to flaps (7).

3. The catalytic reactor according to claim 1, wherein the catalyst is put back into circulation by gravity as soon as circulation has been re-established, with the storage area (11) progressively emptying itself of the catalyst by means of the deflector (15).

4. The catalytic reactor according to claim 1, in which the catalyst is enclosed in ring-shaped baskets (5), the walls of which contain screens that allow a reactant feed to pass from the outside to the inside of the basket (5), and then reaction effluents from the inside of the basket (5) to central collector (3).

5. The catalytic reactor according to claim 1, wherein the flaps (7) slide in fixed vertical sleeves (12) that are located in the extension to the vertical walls of the basket (5) and are equipped with windows (14) obstructed by the sleeves (12) during normal circulation, said windows (14) being released when the basket (5) is raised following an interruption in the circulation of the catalyst, thereby allowing the passage of the catalyst through said windows (14) to the storage area (11) situated in the lower part of the reactor between the sleeves (12) and the wall of the hemispherical base of the reactor, and at a distance d of more than 10 cm from said wall.

6. The catalytic reactor according to claim 5, wherein the flaps (7) or vertical sleeves (12) can be extended by a wall (15) forming an outlet, via which the catalyst will leave storage area (11) to be moved closes to the vertical of a dip leg (2).

7. The catalytic reactor according to claim 5, wherein the windows (14) have a rectangular shape allowing steady entry of the catalyst into the storage area (11).

8. The catalytic reactor according to claim 1, wherein the windows (14) have a triangular shape, with the tip of the triangle pointing upwards, to allow progressive entry of the catalyst into the storage area (11).

9. A petrochemical refining process, comprising subjecting a petrochemical feed to refining conditions, in a reactor according to claim 1.

10. A process for catalytic reforming of a hydrocarbon, comprising subjecting said hydrocarbon to reforming conditions in a reactor according to claim 1.

11. A process for hydrotreatment of residues, comprising subjecting said residues to hydrotreatment conditions in a reactor according to claim 1.

12. The process according to claim 1, wherein the alpha angle is between 45° and 55°.

* * * * *